US009115613B2

(12) United States Patent
Deblaize et al.

(10) Patent No.: US 9,115,613 B2
(45) Date of Patent: Aug. 25, 2015

(54) SPLINED-SHAFT CONNECTION AND VALVE TIMING MECHANISM WITH A SPLINED-SHAFT CONNECTION BETWEEN A CAMSHAFT AND DISPLACEABLE CAM CARRIERS

(75) Inventors: Marc Deblaize, Heilbronn (DE); Stefan Dengler, Wettstetten (DE)

(73) Assignee: AUDI AG, Ingolstadt (DE)

( * ) Notice: Subject to any disclaimer, the term of this patent is extended or adjusted under 35 U.S.C. 154(b) by 715 days.

(21) Appl. No.: 13/056,818

(22) PCT Filed: Jul. 11, 2009

(86) PCT No.: PCT/EP2009/005057
§ 371 (c)(1),
(2), (4) Date: Mar. 29, 2011

(87) PCT Pub. No.: WO2010/012371
PCT Pub. Date: Feb. 4, 2010

(65) Prior Publication Data
US 2011/0185995 A1 Aug. 4, 2011

(30) Foreign Application Priority Data

Jul. 31, 2008 (DE) .......................... 10 2008 035 935

(51) Int. Cl.
*F01L 1/34* (2006.01)
*B25G 3/28* (2006.01)
*F01L 13/00* (2006.01)
*F01L 1/344* (2006.01)

(52) U.S. Cl.
CPC ......... *F01L 13/0036* (2013.01); *F01L 1/34413* (2013.01); *F01L 2013/0052* (2013.01); *Y10T 403/7026* (2015.01); *Y10T 403/7035* (2015.01)

(58) Field of Classification Search
CPC ................. Y10T 403/7026; Y10T 403/7035; F16D 1/06; F16D 1/0858; F16D 1/101; F16D 3/06; F16D 3/841; F16D 2001/103; F16C 3/02; F16C 3/03; F01L 1/34413; F01L 13/0036; F01L 2013/0052
USPC ................ 123/90.15–90.18, 90.27; 29/888.1; 74/567, 595; 403/359.1–359.6; 464/162
See application file for complete search history.

(56) References Cited

U.S. PATENT DOCUMENTS

| 4,124,318 | A | * | 11/1978 | Sagady ........................... 403/14 |
| 4,835,832 | A | * | 6/1989 | Arnold et al. ................. 29/888.1 |
| 4,847,963 | A | * | 7/1989 | Bendoraitas et al. ......... 29/888.1 |
| 5,307,768 | A | * | 5/1994 | Beier et al. .................. 123/90.17 |
| 5,664,463 | A | * | 9/1997 | Amborn et al. .................. 74/567 |

(Continued)

FOREIGN PATENT DOCUMENTS

| DE | 2330875 A1 | 1/1975 | |
| DE | 2802255 A1 | 8/1978 | |
| DE | 3817767 A1 | 12/1989 | |
| DE | 4019119 A1 | 1/1992 | |
| DE | 19523584 A1 | 1/1997 | |
| DE | 19702389 A1 | 7/1998 | |
| DE | 10349902 A1 * | 6/2005 | ............. F01L 1/047 |
| DE | 102005020236 A1 * | 11/2006 | ............. F01L 1/047 |
| JP | 2003184994 A * | 7/2003 | ............. F16H 53/02 |

*Primary Examiner* — Kenneth Bomberg
*Assistant Examiner* — Daniel Wagnitz
(74) *Attorney, Agent, or Firm* — Novak Druce Connolly Bove +Quigg LLP

(57) ABSTRACT

An assembly including a rotatable shaft with external splines and an annular member receiving such shaft, provided with internal splines meshing with the external splines of such shaft wherein the external splines of different segments of the shaft are configured to effectively transmit torque in use and facilitate the mounting of the shaft into the annular member in assembly.

8 Claims, 2 Drawing Sheets

(56) References Cited

U.S. PATENT DOCUMENTS

| | | | | |
|---|---|---|---|---|
| 5,992,017 | A * | 11/1999 | Grafchev et al. | 29/888.1 |
| 6,530,351 | B2 * | 3/2003 | Mikame | 123/90.15 |
| 7,341,032 | B1 * | 3/2008 | Del Santo | 123/90.18 |
| 7,614,373 | B2 * | 11/2009 | Shouji et al. | 123/90.33 |
| 8,419,555 | B2 * | 4/2013 | Tokioka | 464/162 |
| 2005/0247278 | A1 * | 11/2005 | Koshimizu et al. | 123/90.16 |
| 2006/0064872 | A1 * | 3/2006 | Shirai | 29/888.1 |
| 2007/0204819 | A1 * | 9/2007 | Elendt et al. | 123/90.16 |
| 2012/0080258 | A1 * | 4/2012 | Tokioka | 180/444 |
| 2012/0279467 | A1 * | 11/2012 | Scherzinger et al. | 123/90.17 |

* cited by examiner

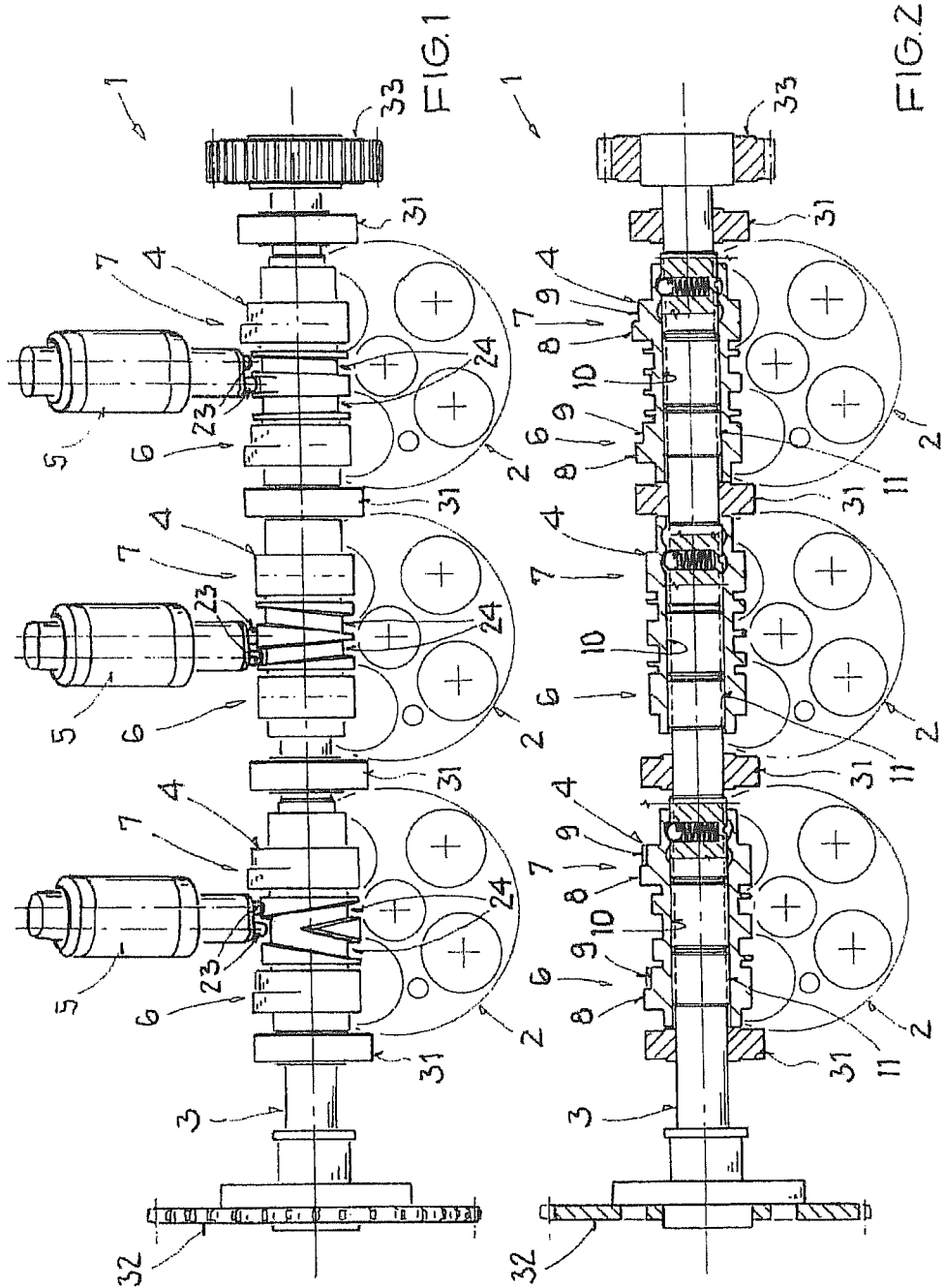

SPLINED-SHAFT CONNECTION AND VALVE TIMING MECHANISM WITH A SPLINED-SHAFT CONNECTION BETWEEN A CAMSHAFT AND DISPLACEABLE CAM CARRIERS

The invention relates to a splined-shaft connection and a valve timing mechanism for gas exchange valves of an internal combustion engine in which there is such a splined-shaft connection between a camshaft and several cam carriers which are guided to be axially displaceable in a rotationally fixed manner on the camshaft.

BACKGROUND OF THE INVENTION

Splined-shaft connections are positive shaft-hub connections which make it possible to transmit torque between two components which are rotating on a common axis of rotation, of which one is generally referred to as the shaft and the other is referred to as the hub. The torque in splined-shaft connections is transmitted via the flanks of adjacent teeth which, in the case of axial relative motion of the two components, should, if possible, adjoin one another with a clearance fit in order to avoid relative movements caused by the fluctuations of the load and torque between the two components in their direction of rotation or their peripheral direction. The two toothing systems which are in tooth engagement, i.e., the external toothing system of the shaft and the internal toothing system of the hollow shaft or hub, are usually either involute toothing systems (DIN 5480) or toothing systems with straight flank shapes (DIN 5481).

Known splined-shaft connections are flank-centered connections in which the flanks are used not only to transmit torque, but also to center the hollow shaft or hub on the shaft. But, in particular for rolled tooth profiles, as a result of production tolerances, the radial play between the two toothing systems which are in tooth engagement can be greater; for flank-centered connections this also leads to greater play between the opposite flanks of the teeth of the internal and external toothing system and thus to relative movements in the direction of rotation or in the peripheral direction of the components during load or torque fluctuations.

On this basis, the object of the invention is to improve a splined-shaft connection and a valve timing mechanism of the initially named type such that radial play compensation in the splined-shaft connection or radial support and centering of the hollow shaft or hub on the shaft is enabled.

SUMMARY OF THE INVENTION

This object is achieved according to the invention in that the two toothing systems over part of their length are opposite one another in the region of a tip-circle diameter and/or a root-circle diameter of the external toothing system with a clearance fit and in the region of the tooth flanks of the internal and external toothing system are opposite one another at a greater distance, and in that the two toothing systems are opposite one another over another part of their length in the region of the tooth flanks of the internal and external toothing with a clearance fit, while they are opposite one another in the region of the tip-circle diameter and the root-circle diameter of the external toothing system with radial play.

The invention is based on the idea of decoupling or separating from one another in the axial direction the regions of the two toothing systems which are used for torque transmission and the regions used for centering by means of the measure according to the invention.

Since the external toothing system can be more easily machined than the internal toothing system, one preferred configuration of the invention provides for the internal toothing system over its entire length to have a uniform profile, whereas the external toothing system is divided in the axial direction of the shaft into at least two segments which have different profiles.

Preferably, for the same number of teeth in the two segments, the teeth of the external toothing system in the segment—or each segment—used for torque transmission have a somewhat greater width and a somewhat smaller height than in the segment—or each segment—used for centering in order to enable mounting of the hollow shaft.

Another preferred configuration of the invention calls for the external toothing system to be divided in the axial direction of the shaft into three segments with different profiles, of which preferably a middle segment is used for torque transmission, while the two segments located on both sides of the middle segment are used for direct support and radial centering. But it would also be possible to divide the external toothing in the axial direction of the shaft into four segments, pairs of which having a different profile, of which two at a time are used for torque transmission and for support and radial centering, the segments used for torque transmission and for radial centering alternating with one another.

The segments in which the external toothing of the shaft is provided with a different profile are suitably separated by narrow cylindrical segments without a toothing system in order to facilitate different machining of the individual segments.

BRIEF DESCRIPTION OF THE DRAWINGS

FIG. 1 shows a top side view of parts of a valve timing mechanism for pairs of inlet valves of three cylinders of a V-6 cylinder engine with several cam carriers which can be displaced on a cam shaft;

FIG. 2 shows a horizontal longitudinal sectional view along a middle axis of the camshaft;

DETAILED DESCRIPTION OF THE PREFERRED EMBODIMENTS OF THE INVENTION

Figure 3:
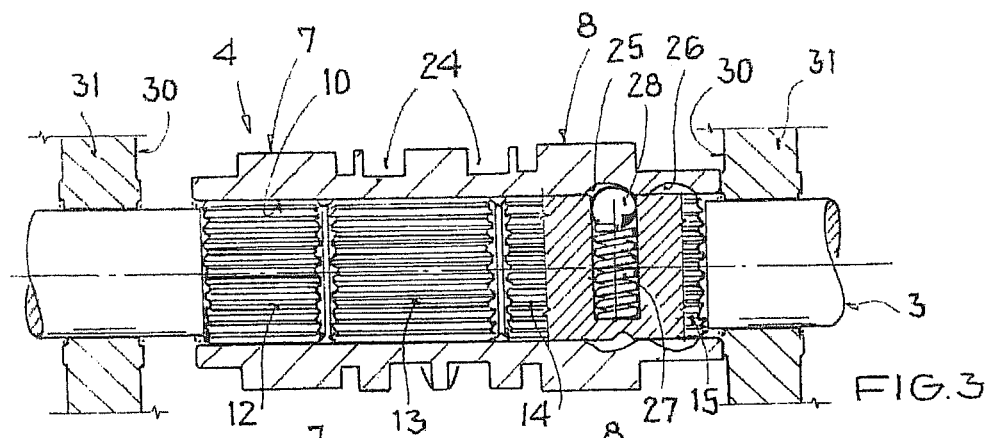
FIG. 3 shows an enlarged view of one segment of the camshaft from FIG. 2 with a cam carrier.

In the valve timing mechanism 1, which is shown only partially in the drawings, for pairs of inlet valves of three cylinders 2 of a V-6-cylinder diesel engine with an overhead camshaft 3 which is rotatably mounted in the cylinder head housing of the diesel engine, the lift and opening times of the two inlet valves of each cylinder 2 which are actuated by the camshaft 3 can be adjusted.

The valve timing mechanism 1 for this purpose comprises for each cylinder 2 and for each pair of inlet valves a cam carrier 4 which is mounted to be axially displaceable in a rotationally fixed manner on the camshaft 3, as well as an actuator 5 (FIG. 1) for displacing the cam carrier 4 between two defined displacement positions located at an axial distance from one another.

The three hollow cylindrical cam carriers 4 on their outer periphery each have two cam pairs 6, 7 which are located at an axial distance from one another and each of which consists of two cams 8, 9 (FIG. 2) with different lift contours. Each of the two cam pairs 6, 7 interacts with a roller of a pivotally mounted roller cam follower (not shown) of the pertinent inlet valve. By axial displacement of the cam carrier 4, the roller can be moved, if necessary, into contact with one of the two cams 8, 9 of the cam pair 6 and 7, so that during each rotation of the camshaft 3 said roller is moved away over the lift contour of the cam 8, 9 one time and in so doing pivots the roller cam follower as the valve is opening. The lift and the opening time of each valve can be changed, for example, depending on the rotational speed as a function of the displacement position of the cam carrier 4 irrespective of the lift and the opening time of the valves of the other cylinders 2.

In order to enable axial displacement of the cam carrier 4 on the camshaft 3, the hollow cylindrical cam carriers 4 on their inner periphery have an internal toothing system 10 which meshes with the external toothing system 11 on the camshaft 3, and between the camshaft 3 and each cam carrier 4 forms a splined-shaft connection with axial relative mobility, which is used to transmit torque between the camshaft 3 and the cam carrier 4 and to support and center the cam carrier 4 directly on the camshaft 3.

Figure 4:
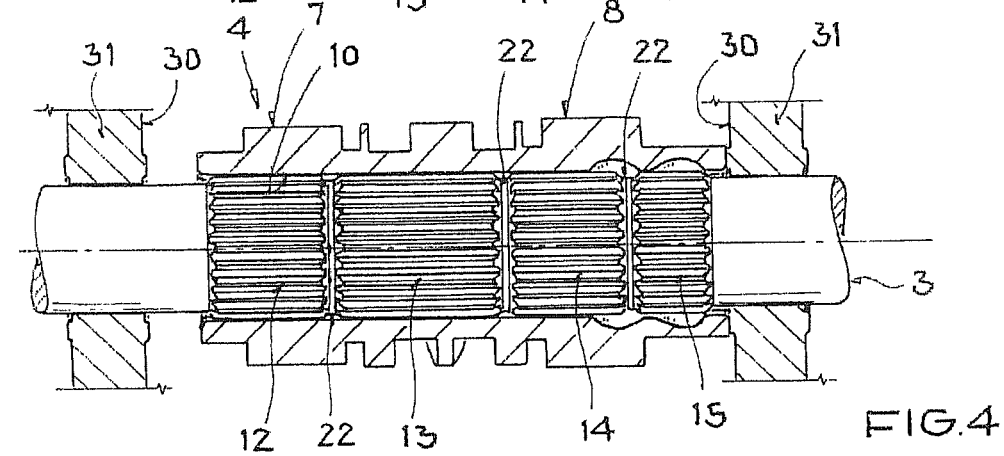
FIG. 4 shows a view according to FIG. 3 which shows an external toothing system of the camshaft.

In order to separate the torque transmission function from the support and centering function, the external toothing system 11 of the camshaft 3 has four segments 12, 13, 14, 15 which are separated from one another in the axial direction with tooth profiles for each cam carrier 4, pairs of which are different, as is best illustrated in FIGS. 3 and 4. The four segments 12, 13, 14, 15 each have different lengths and together extend over a total length which corresponds essentially to the length of the cam carrier 4, all of them being in tooth engagement with the internal toothing system 10 which has the same tooth profile over its entire length.

While the two segments 13 and 15 which are separated by the segment 14 are used to transmit torque, the two segments 12 and 14 which are separated by the segment 13 are used for direct radial support of the cam carrier 4 on the camshaft 3 and for centering of the cam carrier 4 and the camshaft 3 relative to the axis of rotation of the camshaft 3. The tooth profiles of the two segments are preferably manufactured and rolled at the same time.

Figure 5:
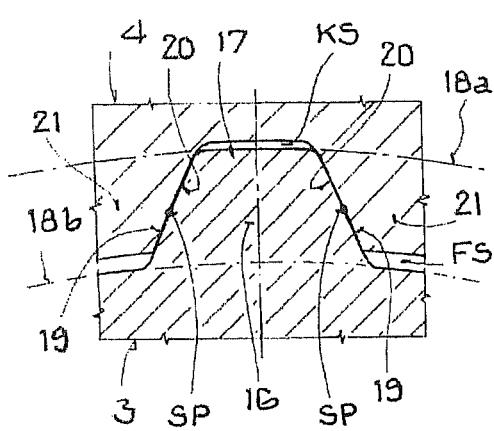
FIG. 5 shows a detailed view of the engagement of one tooth of the external toothing system of the camshaft between two teeth of the internal toothing system of the cam carrier in a first and third segment of the external toothing system.

As is best shown in FIG. 5, the tooth profile of the external toothing system 11 in segments 13 and 15 is matched to the tooth profile of the internal toothing system 10 such that teeth 16 of the external toothing system 11 of the camshaft 3 and adjacent teeth 21 of the internal toothing system 10 of each cam carrier 4 are opposite one another along their facing flanks 19, 20 with a clearance fit, while along a tip-circle diameter 18$a$ of the external toothing system 11, there is conventional tip play KS between a tip 17 of the teeth 16 and an opposite region of the internal toothing system 10 so that there is no contact of the teeth 16, 21 there. Moreover, along a root-circle diameter 18$b$ of the external toothing system 11, there is also conventional root play FS between a tip of the teeth 21 of the internal toothing system 10 and an opposite region of the external toothing 11 system so that there is no contact of the teeth 21, 16 there either. As in conventional gears, the tip play KS and the root play FS is between 0.1 and 0.3 m, with m being the modulus of the external toothing system 11.

Figure 6:
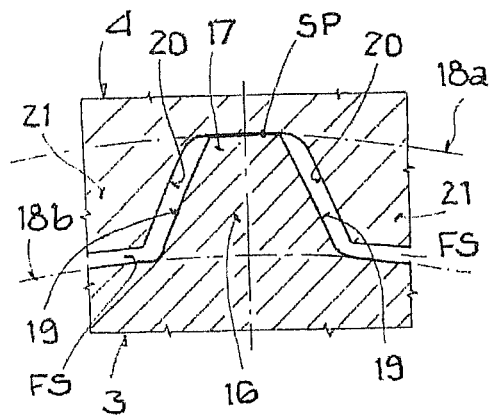
FIG. 6 shows a detailed view of the engagement of one tooth of the external toothing system of the camshaft between two teeth of the internal toothing system of the cam carrier in a second and fourth segment of the external toothing system.

As is best shown in FIG. 6, the tooth profile of the external toothing system 11 in the segments 12 and 14 is matched to the tooth profile of the internal toothing system 10 such that teeth 16 of the external toothing system 11 with their tip 17 are opposite one another along part of the tip-circle diameter 18$a$ of the external toothing system 11 with a clearance fit SP of the internal toothing system 10, while along their opposite tooth flanks 19 they have a greater distance A from the respectively opposite tooth flanks 20 of the teeth 21 of the internal toothing system 10. The distance A is dimensioned such that there is no contact of the teeth 16, 21 on the tooth flanks 19, 20. The distance A is, however, much greater than an upper play or an upper boundary of the clearance fit SP and is preferably also greater than the tip play KS, i.e., greater than 0.1 to 0.3 m.

Alternatively or in addition, the teeth 21 of the internal toothing 10 with their tips can be opposite one another along part of a root-circle diameter 18$b$ of the external toothing system 11 with a clearance fit SP of the internal toothing system 10, while along their opposite tooth flanks 20 they have a greater distance A from the respectively opposite tooth flanks 19 of the teeth 16 of the external toothing system 11. The distance A is likewise dimensioned such that there is no contact of the teeth 21, 16 on the tooth flanks 20, 19. The distance A, in each case, is much greater than an upper play or an upper boundary of the clearance fit SP and is preferably also greater than the root play FS, i.e., greater than 0.1 to 0.3 m.

The clearance fit SP which is present in all segments between the two toothing systems 10, 11 allows axial displacement of the cam carrier 4 on the camshaft 3. The respectively adjacent segments 12, 13 and 13, 14 and 14, 15, are separated by narrow annular segments 22 of the camshaft 3 without a toothing system.

The external toothing system 11 on the camshaft 3 is produced by initially the two pairs of segments 12 and 14 as well as 13 and 15 being rolled with different profiles, the distance of the two opposite flanks 19 of the teeth 16 in the segments 13 and 15 being greater than in the segments 12 and 16.

In the case of a radial support of a cam carrier 4 along the tip-circle diameter 18 of the external toothing system 11 of the camshaft 3, the tips 17 of the teeth 16 in segments 13 and 15 are additionally ground off after rolling, since the tip-circle diameter 18 of the external toothing system 11 of the camshaft 3 cannot be produced accurately enough during rolling.

For this reason, radial support of the cam carrier 4 along the root-circle diameter 18$b$ of the external toothing system 11 of the camshaft 3 is preferable since the root-circle diameter 18$b$ of the external toothing 11 of the camshaft 3 and the opposite tip-circle diameter of the internal toothing system 10 of each cam carrier 4 can be finished-rolled.

The axial displacement of a cam carrier 7 on the camshaft 4 into one of the two defined displacement positions for adjusting the lift and/or the opening times of the pertinent inlet valves 2 takes place when required and is always carried out when the base circle segments of the cam pairs 8, 9 are opposite the rollers of the pertinent cam follower. For purposes of displacement, the respective actuator 5 is actuated; it has two drivers 23 (FIG. 1) which are located next to one another and which can be extended out of the actuator 5. When the actuator 5 is actuated, one of the two drivers 23, when being extended, is tracked into a left-handed or right-handed helical groove 24 in the outer periphery of the cam carrier 4, which groove is opposite the tracking driver 23 in one of the two displacement positions in order to move the cam carrier 4 during a subsequent rotation of the camshaft 3 as a result of the movement of the driver 23 through the helical groove 24 to the left or to the right into the respective other displacement position.

The distance of the two displacement positions corresponds to the center distance of the two cams 10, 11 of each cam pair 8, 9 and to the axial distance of two locking grooves 25, 26 (FIG. 3) which are recessed in proximity to the face end of each cam carrier 4 in its inner periphery. The two locking grooves 25, 26 are used to lock the cam carrier 4 in the two defined displacement positions. Locking takes place by a locking ball 28 which is located in a transverse hole 27 of the camshaft 4 being pressed by the force of a helical compression spring 29 against a sloped flank of one of the two grooves 25, 26, and an axial force component is introduced into the cam carrier 4 in order to press the latter against a face surface 30 of an adjacent pivot bearing 31, which surface is used as a stop, as is best illustrated in FIGS. 3 and 4.

The camshaft 4 is driven via a chain wheel 32 on a face end of the camshaft 4, while a gear 33 on the opposite face end drives an A-shaft.

The invention claimed is:

1. An assembly comprising:
   a shaft rotatable about the axis thereof with external splines; and
   an annular member receiving said shaft therethrough, provided with internal splines meshing with said external splines of said shaft and being axially displaceable relative to said shaft upon rotation of said shaft about the axis thereof;
   wherein in a first segment of the external splines of said shaft, the top land of each external spline is spaced from the bottom land of a successive set of internal splines, and the flanks of each external spline abut the opposed flanks of a successive set of internal splines; and
   in a second segment of the external splines of said shaft, the top land of each external spline abuts the bottom land of a successive set of internal splines, and the flanks of each external spline are spaced less than the opposed flanks of a successive set of internal splines.

2. An assembly according to claim 1 wherein the length of said second segment is greater than the length of said first segment.

3. An assembly according to claim 1 wherein said first and second segments are separated by a narrow cylindrical space.

4. An assembly according to claim 1 including a third segment configured similarly to said first segment, and said second segment is disposed between said first and third segments.

5. An assembly according to claim 4 including a fourth segment configured similarly to said second segment, and said third segment is disposed between said second and fourth segment.

6. An assembly according to claim 5 wherein the length of said third segment is greater than said fourth segment.

7. An assembly according to claim 1 wherein said shaft comprises a cam shaft and said annular member comprises a cam carrier of an internal combustions chamber.

8. An assembly according to claim 7 including means for rotating said shaft about the axis thereof to axially displace said annular member.

* * * * *